US006657590B2

(12) United States Patent
Yoshida

(10) Patent No.: US 6,657,590 B2
(45) Date of Patent: Dec. 2, 2003

(54) ADAPTIVE ANTENNA RECEPTION APPARATUS USING RECEPTION SIGNALS BY ARRAYS ANTENNAS

(75) Inventor: Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/161,714

(22) Filed: Jun. 5, 2002

(65) Prior Publication Data

US 2002/0190901 A1 Dec. 19, 2002

(30) Foreign Application Priority Data

Jun. 6, 2001  (JP) ........................................ 2001-170375

(51) Int. Cl.[7] .............................................. G01S 3/16
(52) U.S. Cl. ...................... 342/383; 375/347; 375/349; 455/137
(58) Field of Search ........................ 342/383; 375/347, 375/349; 455/103, 101, 137

(56) References Cited

U.S. PATENT DOCUMENTS

| | | | | |
|---|---|---|---|---|
| 5,966,095 A | * | 10/1999 | Hiramatsu et al. | 342/383 |
| 6,064,338 A | * | 5/2000 | Kobayakawa et al. | 342/383 |
| 6,069,912 A | * | 5/2000 | Sawahashi et al. | 375/347 |
| 6,128,330 A | * | 10/2000 | Schilling | 375/347 |
| 6,205,166 B1 | * | 3/2001 | Maruta et al. | 375/345 |
| 2003/0073463 A1 | * | 4/2003 | Shapira | 455/562 |

FOREIGN PATENT DOCUMENTS

| | | | | |
|---|---|---|---|---|
| EP | 0936755 A2 | * | 8/1999 | ............ H04B/7/08 |
| JP | 10-341200 | | 12/1998 | |
| JP | 11-55216 | | 2/1999 | |
| JP | 2914445 | | 4/1999 | |
| JP | 11-298388 | | 10/1999 | |
| JP | 3092798 | | 7/2000 | |
| JP | 2000-188568 | | 7/2000 | |
| WO | WO97/20400 | | 6/1997 | |

* cited by examiner

Primary Examiner—Thomas H. Tarcza
Assistant Examiner—Fred H Mull
(74) Attorney, Agent, or Firm—McGinn & Gibb, PLLC

(57) ABSTRACT

An adaptive antenna reception apparatus includes a plurality of receiving sections and a combining unit. Each of the plurality of receiving sections is provided for a corresponding one of paths. The receiving section generates a path-corresponding demodulation signal for the corresponding path and for a corresponding one of arrays of antennas from path-corresponding despread signals for the corresponding path and for the corresponding array using adaptive weights for the corresponding array. The combining unit combines the path-corresponding demodulation signals over all the arrays and all the paths to generate a demodulation signal.

18 Claims, 5 Drawing Sheets

ADAPTIVE ANTENNA RECEPTION APPARATUS USING RECEPTION SIGNALS BY ARRAYS ANTENNAS

BACKGROUND OF THE INVENTION

1. Field of the Invention

The present invention relates to an adaptive antenna reception apparatus. More particularly, the present invention is directed to an adaptive antenna reception apparatus which receives a CDMA (code division multiple access) signal by arrays of antennas and generates a demodulation signal.

2. Description of the Related Art

A CDMA system has a possibility that the number of subscribers can be increased, and is expected as a radio access system of a mobile communication celler system. However, there is a problem that a signal from a user acts as an interference signal to another signal from another user in a base station receiving end.

An adaptive array antenna reception apparatus is known as a method of receiving only a desired signal while removing these interference signals. The adaptive array antenna reception apparatus receives a signal by a plurality of antennas and carries out a complex weighting and combining operation, controls the amplitude and phase of the reception signal by each antenna to form a directional beam to receive the desired user signal, and to suppress the other user interference signals.

The reception characteristic of the adaptive array antennas strongly depends on the arrangement of the array of antennas and the antenna interval between the antennas. Generally, the fading correlation of reception signals becomes high when the antenna interval is made narrow. As a result, the directionality needs be made narrow. However, there is a problem that the diversity effect decreases at the same time. In the environment severe in fading as in mobile communication, it is sometimes better in improvement of the reception characteristic to carry out diversity-combining and to compensate the fading rather than to control the directionality to be narrow.

A sub-array arrangement is known as the array antenna arrangement having the directionality control effect and the diversity effect. The array antenna arrangement with a sub-array structure is shown in FIG. 1. Referring to FIG. 1, the array antenna is comprised of a sub-array of antennas 31-1-1 to 31-1-N and a sub-array of antennas 31-2-1 to 31-2-N. The antenna interval between the antennas in the sub-array is set narrow so that it is possible to carry out the directionality control. The antenna interval in the sub-array is generally set to be 0.5 wavelengths. The sub-array interval between the sub-arrays is set wide for the diversity effect so as to be obtained. The sub-array interval is generally set to be equal to or more than 10 wavelengths.

FIG. 2 shows the circuit structure of a conventional example of an adaptive antenna reception apparatus which uses this sub-array arrangement. Referring to FIG. 2, the conventional example of the adaptive antenna reception apparatus receives a CDMA signal by the antennas of sub-arrays with the sub-array structure, independently carries out adaptive directionality forming for every sub-array, diversity-combines the reception signals and outputs a demodulation signal.

A receiving and demodulating section corresponding to two sub-arrays is comprised of L (L is a positive integer) path receiving sections 41-1-1 to 41-1-L, 41-2-1 to 41-2-L for the number of paths of a transmission multi-path, combining units 49-1 and 49-2, decision units 50-1 and 50-2, switches 51-1 and 51-2, subtractors 52-1 and 52-2 and an adder 53 which combines the outputs of two combining units 49-1 and 49-2.

The path receiving sections 41-1-1 to 41-1-L have the same circuit structure and carry out the same operation. Therefore, the path receiving section 41-1-1 will be described. The path receiving section 41-1-1 is comprised of a beam former 42-1-1, a channel estimating section 43-1-1, a complex conjugate calculating section 44-1-1, a multiplier 45-1-1, a normalizing section 46-1-1, a multiplier 47-1-1, and an antenna weight adaptive control section 48-1-1.

The beam former 42-1-1 receives antenna-corresponding despread signals #1-1 to #1-N as a path #1 despread signal for a user and outputs a path-corresponding beam former signal from the antenna-corresponding despread signals #1-1 to #1-N with an antenna directionality using adaptive weights peculiar to the user and generated adaptively.

The channel estimating section 43-1-1 estimates a channel estimation signal from the path-corresponding beam former signal outputted from the beam former for the path #1. The complex conjugate calculating section 44-1-1 carries out a complex conjugate calculating operation of the channel estimation signal for the path #1 and outputs a complex conjugate signal. The multiplier 45-1-1 multiplies the path-corresponding despread signal from the beam former outputs for the path #1 and the complex conjugate signal from the complex conjugate calculating section 44-1-1. At this time, the multiplier 45-1-1 corrects a phase change in the path #1 and carries out a weighting operation for the maximum ratio combining. The maximum ratio combining is a method of weighting and combining such that SINR (signal power vs. interference noise power ratio) after the combining becomes maximum.

The combining unit 49-1 adds or combines the outputs of the multipliers 45-1-1 for path combining and generates a path-corresponding demodulation signal for the path #1 and for the sub-array 31-1. The decision unit 50-1 determines a transmission signal with a high transmission possibility from the user from the demodulation signal for the sub-array 31-1. The switch 51-1 selects as a reference signal, a known reference signal when there is the known reference signal, and the transmission signal from the decision unit 50-1 when there is not any known reference signal. The subtractor 52-1 subtracts the demodulation signal for the sub-array 31-1 from the reference signal and generates an error signal. The error signal is distributed to the path receiving sections 41-1-1 to 41-1-L.

The normalizing section 46-1-1 carries out a normalizing operation to the channel estimation signal estimated by the channel estimating section 43-1-1. Here, the normalizing section 46-1-1 may be omitted to reduce a calculation quantity. The multiplier 47-1-1 multiplies the normalized channel estimation signal from the normalizing section and the error signal. The antenna weight adaptive control section 48-1-1 updates the antenna weights adaptively by using the antenna-corresponding despread signals for the path #1 and for the sub-array 31-1 and the output of the multiplier 47-1-1. In the antenna weight adaptive control section 48-1-1, minimum mean squared error (MMSE) control is generally used. In the MMSE control, the control is carried out so as to maximize the reception SINR, in addition to direct the beam to the desired user signal.

The path receiving sections 41-2-1 to 41-2-L have the same circuit structure as the path receiving section 41-1-1 and carry out the same operation as the path receiving section 41-1-1. Also, the combining unit 49-2, the decision unit 50-2, the switch 51-2, and the subtractor 52-2 carry out the same operations as those of the combining unit 49-1, the decision unit 50-1, the switch 51-1, and the subtractor 52-1, respectively.

The adder 53 adds the demodulation component signal for the first set and the demodulation component signal for a second set and outputs a demodulation signal for the user.

In the adaptive update algorithm using the above-mentioned determination error signal, algorithms such as LMS (Least Mean Square) algorithm and RLS (Recursive Least Square) algorithm are known. For example, the antenna weights $w_1$ (l,n), $w_2$ (l,n) (l is a path number and n is a symbol number) of the respective sub-arrays when the LMS algorithm is used are updated in accordance with the following equations:

$$w_1(l,n+1)=w_1(l,n)+\mu r_1(l,n)e_1^*(l,n)$$
$$w_2(l,n+1)=w_2(l,n)+\mu r_2(l,n)e_2^*(l,n)$$

where $r_1$ (l,n) and $r_2$ (l,n) represent the despread signals of the respective sub-arrays or the respective paths, $e_1^*$(l,n) and $e_2^*$(l,n) represent complex conjugates of the error signals when the inverse correction of the phase changes of the respective sub-arrays is carried out, and $\mu$ is a step size in the LMS algorithm.

In the conventional adaptive antenna reception apparatus shown in FIG. 2, the adaptive directionality forming for every sub-array is independently carried out, and the signals are subjected to the diversity combining and then the demodulation signal is outputted. Because the fading correlation between the reception signals is low but the interval between the sub-arrays is only several m. Therefore, the arrival direction of the multi-path signal and the delay time become similar.

The conventional adaptive antenna reception apparatus has a phase correction function of the transmission path, that is, the channel estimating section 43-1-1 to 43-1-L, 43-2-1 to 43-2-L are arranged separating from the beam formers 42-1-1 to 42-1-L, 42-2-1 to 42-2-L. Therefore, the beam formers 42-1-1 to 42-1-L, 42-2-1 to 42-2-L are not necessary to follow the fading, and are sufficient to adaptively control the directionality in accordance with only the change of the arrival direction of the multi-path signal.

Therefore, it could be thought that a similar directional pattern is formed in each sub-array. However, because the conventional example of the adaptive antenna reception apparatus uses the antenna weights different for every sub-array, there is a problem that determination error data are not utilized effectively in the adaptive control.

In conjunction with the above description, an adaptive array antenna reception apparatus is disclosed in Japanese Laid Open Patent application (JP-A-Heisei 10-341200). In this reference, the adaptive array antenna reception apparatus is comprised of a complex multiplication section for multiplying a reception signal by complex weighting coefficients. An addition section adds the output signals of the complex multiplication section. A modulation section modulates a known symbol. A difference output section calculates a difference between the output of the addition section and the output of the modulation section. A weighting coefficient calculation section calculates the complex weighting coefficients from the reception signal and the output of the difference output section only when known signal patterns of a desired station and an interference station are different.

Also, an adaptive reception apparatus is disclosed in Japanese Laid Open Patent application (JP-A-Heisei 11-298388). In this reference, the adaptive reception apparatus is comprised of N (N is a positive integer) receiving antennas for receiving a signal in which signals from a plurality of users are multiplexed. K (K is a positive integer) adaptive reception blocks form a directional pattern with a gain to an optional direction for the reception signal by the reception antennas and receive desired wave signals of a plurality of paths while suppressing an interference wave signal. A weight control error combining section combines a plurality of weight control errors in combination of optional the path with the user and generates a combining weight control error signal. The adaptation reception block forms the directional pattern based on the combining weight control error signal.

Also, a reception apparatus is disclosed in Japanese Laid Open Patent Application (JP-P 2000-188568A). In this reference, the reception apparatus is of a time divisional transmission system, and transmits data on the form of time slots. The reception apparatus is comprised of a detection section provided for each of a plurality of antennas, and detects the signal received by each antenna to output a baseband signal. A combining section multiplies baseband signals by complex weights and combines the multiplied signals. A decision section determines a transmission symbol from the combined baseband signal by the combining section. A reference signal generating section generates known symbol which should be transmitted as a reference signal. An error detecting section generates an error signal of the combined baseband signal and the reference signal. A weight calculating section calculates a weight corresponding to each antenna from the error signal and the baseband signal and updates the weight sequentially. A update quantity of each weight by the weight calculating section is set to a product of the error signal, a step size function and each baseband signal, and the step size function is a function in which the value becomes small in accordance with elapse of time, and is initialized every time the time slot changes.

Also, a CDMA adaptive reception apparatus is disclosed in Japan Patent No. 2,914,445. In this reference, the CDMA adaptive reception apparatus is comprised of N antennas which receive a code division multiple access signal. A weighting and combining section carries out a weighting and combining operation to the outputs of the N antennas, receives a desired wave signal in a directional pattern which has gains to all the arrival directions of M paths of the desired wave signal of a multi-path, and suppresses an interference wave signal. M despreading sections which carry out a despreading operation to the outputs of the weighting and combining section at the timings of paths of the desired wave signal using a spreading code. M demodulating sections which demodulate the outputs of the M despreading sections, and output complex channel estimation data. A first combining unit combines the outputs of the M demodulating sections. A decision unit determines the output of the first combining unit and outputs a result as a determination signal. An error generating section combines the determination error generated by inputting the outputs of the despreading sections and the complex channel estimation data for every path and generates an error signal for the weight control. A weight control section controls the antenna weight coefficients corresponding to the antenna and used in the weighting and combining section based on the error signal.

Also, an adaptive transmitter-receiver is disclosed in Japan Patent No. 3,092,798. In this reference, a CDMA (code division multiple access) system adaptive transmitter-receiver is comprised of a path search section which finds path level data and path delay time data from antenna reception signals. M (M is a positive integer) adaptive receiving sections inputs the N (N is a positive integer) antenna reception signals, forms a reception directional pattern which has a gain to the direction of a desired wave signal for every path delay time, receives the desired wave signal, and suppresses an interference wave signal. A reception antenna weight selecting section selects reception antenna weights to the L (L is an integer equal to or less than M) transmission path from among the M reception antenna weights of the adaptive receiving section using the path level data. L transmission antenna weight control units determine the transmission antenna weights which forms the transmission directional pattern using the output of the reception antenna weight selection section. An adaptive transmission section forms the transmission directional pattern which has a gain to a user direction using the transmission antenna weights as the output of the transmission antenna weight control unit, and outputs N combined antenna transmission signals to transmit the desired wave signal.

Also, a diversity reception apparatus is disclosed in International Patent application WO97/20400. In the diversity reception apparatus of this reference, a correlation unit despreads a plurality of fading reception waves for every branch, when a data signal which has been transmitted in a direct CDMA system is received. A plurality of multipliers multiply despread signals and weight coefficients. The diversity reception apparatus is comprised of an identification section which reproduces the data signal, and a weight coefficient calculating section which uses an identification error signal which is obtained from an input signal to the identification section and an output from the identification section, as feedback data for controlling the weight coefficients.

SUMMARY OF THE INVENTION

Therefore, an object of the present invention is to provide an adaptive antenna reception apparatus which can realize an excellent adaptive control characteristic.

Another object of the present invention is to provide an adaptive antenna reception apparatus which generates a demodulation signal from a code division multiple access signal received antennas of arrays, in which fading is independent.

In an aspect of the present invention, an adaptive antenna reception apparatus includes a plurality of receiving sections and a combining unit. Each of the plurality of receiving sections is provided for a corresponding one of paths to generate a path-corresponding demodulation signal for the corresponding path and for a corresponding one of arrays of antennas from path-corresponding despread signals for the corresponding path and for the corresponding array using adaptive weights for the corresponding array. The combining unit combines the path-corresponding demodulation signals over all the arrays and all the paths to generate a demodulation signal.

Here, each of the plurality of receiving sections may include a plurality of beam formers, a plurality of phase change correction sections and a weight adaptive control section. Each of the plurality of beam formers generates a path-corresponding beam former signal for the corresponding array from the path-corresponding despread signals for the corresponding path and for the corresponding array using the adaptive weights for the corresponding array. Each of the plurality of phase change correction sections is provided for the plurality of beam formers, calculates a channel estimation signal from the path-corresponding beam former signal for the corresponding array signal and carries out a phase change correction to the path-corresponding beam former signal for the corresponding array based on the channel estimation signal to produce the path-corresponding demodulation signal for the corresponding array. The weight adaptive control section is provided for the plurality of beam formers to supply the adaptive weights to a corresponding one of the plurality of beam formers based on the path-corresponding despread signals and error signals for the corresponding path and the arrays. The error signal shows a difference between the demodulation signal and a determined transmission signal or a known reference signal.

In this case, each of the plurality of phase change correction sections may include a channel estimating section, a correction value calculating unit and a phase correction multiplier. The channel estimating section estimates the channel estimation signal from the path-corresponding beam former signal. The correction value calculating unit calculates a correction value from the channel estimation signal. The phase correction multiplier multiplies the path-corresponding beam former signal and the correction value to produce the path-corresponding demodulation signal.

Also, the adaptive antenna reception apparatus may further include a decision unit, a switch section and a subtractor. The decision unit determines the determined transmission signal from the demodulation signal. The switch section selects as a reference signal, one of the determined transmission signal and the known reference signal. The subtractor subtracts the demodulation signal from the reference signal to produce a subtraction resultant signal. In this case, each of the plurality of receiving sections may further include an error signal generating section which multiplies the subtraction resultant signal and the channel estimation signal or a scaling data signal obtained from the channel estimation signal to produce and supply the error signal to the weight adaptive control section.

Also, each of the plurality of receiving sections may further include a normalizing section which generates the scaling data signal from the channel estimation signal.

Also, each of the plurality of receiving sections may include a plurality of beam formers, a plurality of phase change correction sections and a weight adaptive control section. Each of the plurality of beam formers generates a path-corresponding beam former signal for the corresponding array from the path-corresponding despread signals for the corresponding path and for the corresponding array using the adaptive weights for the corresponding array. Each of the plurality of phase change correction sections is provided for the plurality of beam formers, calculates a channel estimation signal from the path-corresponding beam former signal for the corresponding array signal and carries out a phase change correction to the path-corresponding beam former signal for the corresponding array based on the channel estimation signal to produce the path-corresponding demodulation signal for the corresponding array. The weight adaptive control section is provided for the plurality of beam formers to supply the adaptive weights to the plurality of beam formers based on the path-corresponding despread signals and error signals for the corresponding path and the arrays. The error signal show a difference between the path-corresponding beam former signal for the corresponding array and a scaled signal corresponding to a determined transmission signal or a known reference signal.

In this case, each of the plurality of phase change correction sections may include a channel estimating section, a correction value calculating unit and a phase correction multiplier. The channel estimating section estimates the channel estimation signal from the path-corresponding beam former signal. The correction value calculating unit calculates a correction value from the channel estimation signal. The phase correction multiplier multiplies the path-corresponding beam former signal and the correction value to produce the path-corresponding demodulation signal.

Also, the adaptive antenna reception apparatus may further include a decision unit and a switch section. The decision unit determines the determined transmission signal from the demodulation signal. The switch section selects as a reference signal, one of the determined transmission signal and the known reference signal. Each of the plurality of receiving sections may further include a scaled signal generating section, and a subtractor. The scaled signal generating section multiplies the reference signal and the channel estimation signal or a scaling data signal obtained from the channel estimation signal to produce the scaled signal. The subtractor subtracts the path-corresponding beam former signal for the corresponding array from the scaled signal to produce and supply the error signal to the weight adaptive control section.

In this case, each of the plurality of receiving sections may further include a normalizing section which generates the scaling data signal from the channel estimation signal.

Also, fading is independent in the arrays.

Also, in another aspect of the present invention, a method of demodulating a demodulation signal form a code division multiple access (CDMA) signal, may be achieved by (a) generating path-corresponding despread signals for a corresponding one of paths and for a corresponding one of arrays of antennas from signals obtained by receiving the CDMA by the antennas of the corresponding array; by (b) generating a path-corresponding beam former signal for the corresponding array from the path-corresponding despread signals for the corresponding array using adaptive weights; by (c) generating a path-corresponding demodulation signal for the corresponding array from the path-corresponding beam former signal; and by (d) combining the path-corresponding demodulation signal over all the paths and all the arrays to produce the demodulation signal.

The step of (c) generating may be achieved by estimating a transmission path for the corresponding array from the path-corresponding beam former signal for the corresponding array to produce a channel estimation signal for the corresponding array; by calculating a phase change correction signal for the corresponding array from the channel estimation signal for the corresponding array; and by generating the path-corresponding demodulation signal for the corresponding array from the path-corresponding beam former signal for the corresponding array and the phase change correction signal for the corresponding array.

Also, the step of (b) generating may be achieved by (e) generating the adaptive weights from the path-corresponding despread signals and an error signal for the corresponding path and the corresponding array, the error signal showing a difference between the demodulation signal and a determined transmission signal or a known reference signal.

In this case, the step of (e) generating may be achieved by decision a transmission signal from the demodulation signal; by selecting as a reference signal, one of the transmission signal and the known reference signal; by subtracting the demodulation signal from the reference signal to produce a subtraction resultant signal; and by multiplying the subtraction resultant signal and the channel estimation signal or a scaling data signal obtained from the channel estimation signal to produce the error signal.

Also, the step of (b) generating may be achieved by (f) generating the adaptive weights from the path-corresponding despread signals and an error signal for the corresponding path and the corresponding array, the error signal showing a difference between the path-corresponding beam former signal for the corresponding array and a scaled signal corresponding to a determined transmission signal or a known reference signal.

In this case, the step of (f) generating may be achieved by decision the determined transmission signal from the demodulation signal; by selecting as a reference signal, one of the determined transmission signal and the known reference signal; by multiplying the reference signal and the channel estimation signal or a scaling data signal obtained from the channel estimation signal to produce the scaled signal; and by subtracting the path-corresponding beam former signal for the corresponding array from the scaled signal to produce the error signal.

Also, the step of (b) generating further may be achieved by generating the scaling data signal from the channel estimation signal.

DESCRIPTION OF THE PREFERRED EMBODIMENTS

Hereinafter, an adaptive antenna reception apparatus of the present invention will be described with reference to the attached drawings.

Figure 1:
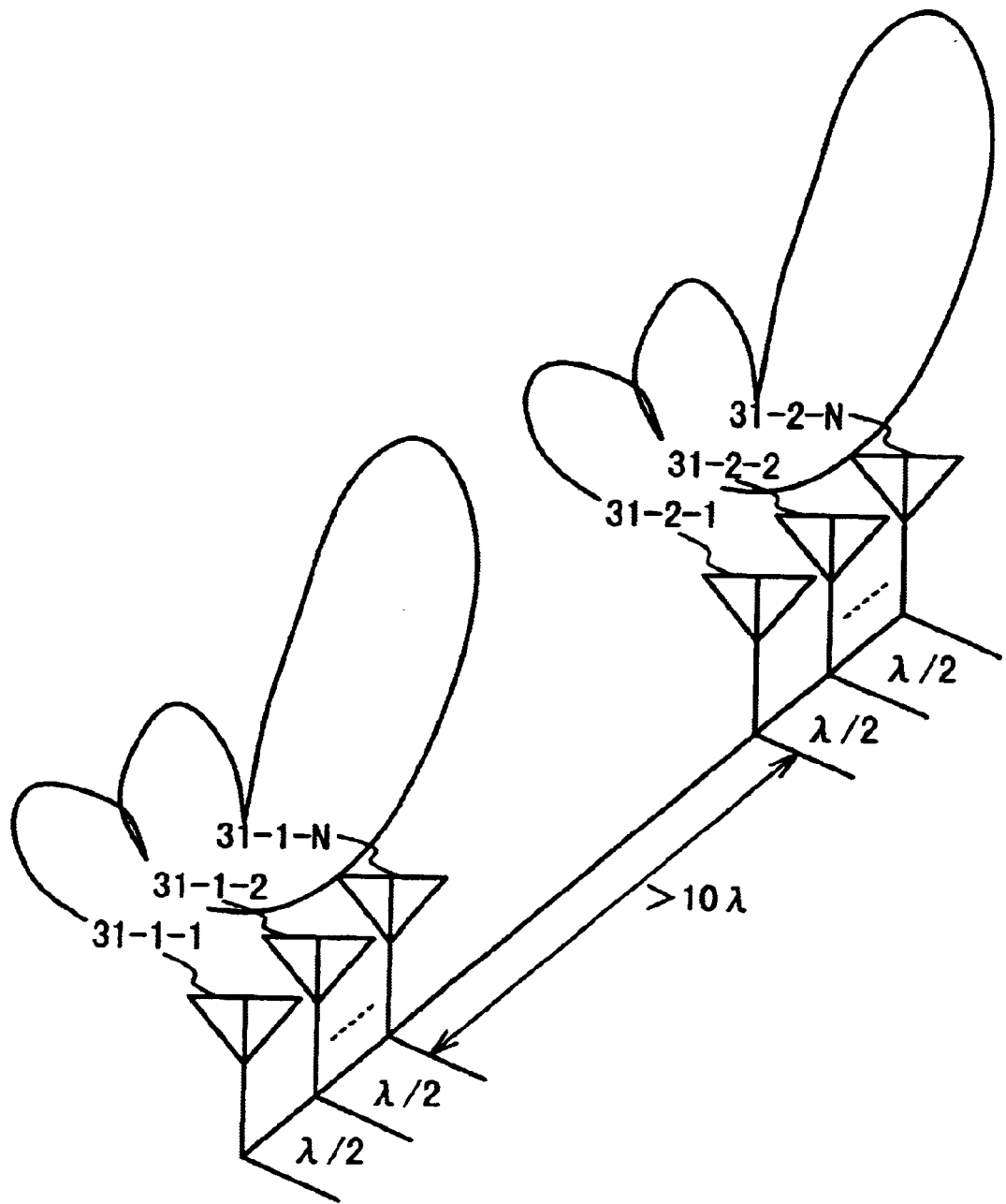
FIG. 1 is a diagram showing an array antenna arrangement with sub-arrays structure.
Figure 2:
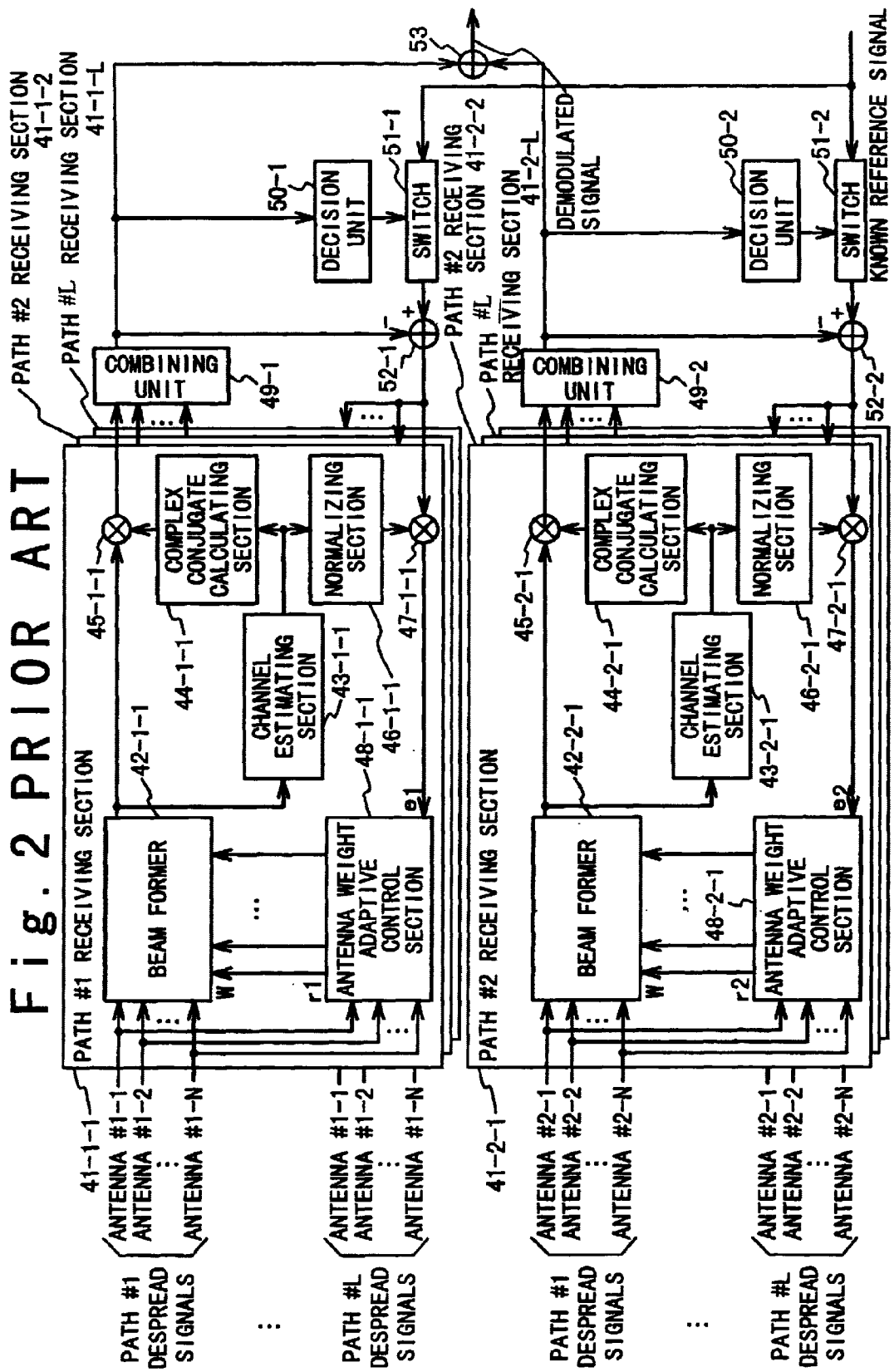
FIG. 2 is a block diagram showing the circuit structure of a conventional example of an adaptive antenna reception apparatus.
Figure 3:
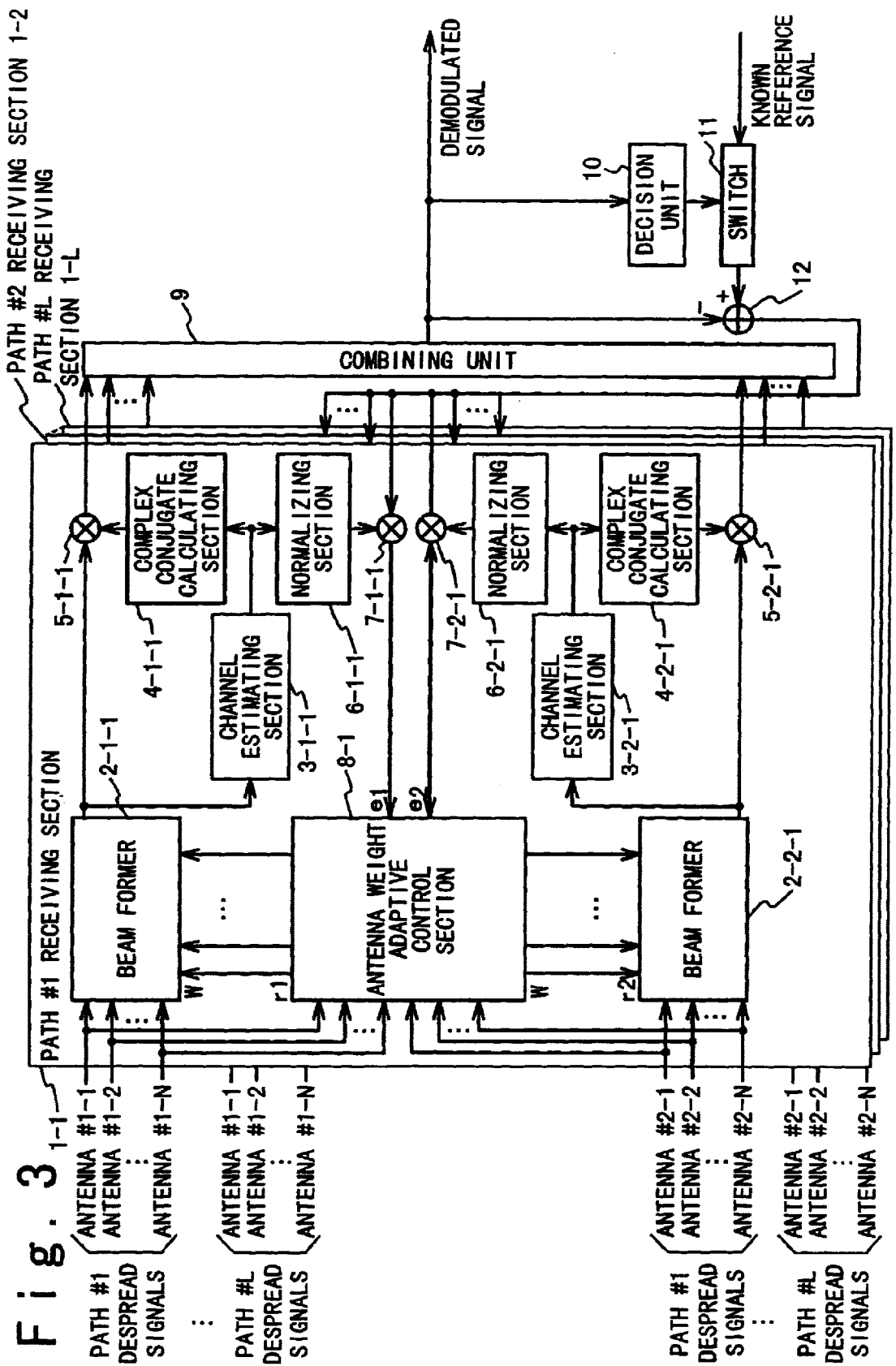
FIG. 3 is a block diagram showing the circuit structure of an adaptive antenna reception apparatus according to a first embodiment of the present invention.

FIG. 3 is a block diagram showing the circuit structure of an adaptive antenna reception apparatus according to the first embodiment of the present invention. Referring to FIG. 3, the adaptive antenna reception apparatus according to the first embodiment of the present invention receives a CDMA (Code Division Multiple Access) signal by antennas of arrays with a sub-array structure, carries out adaptive directionality forming in common to each array with adaptive weights, and diversity-combines signals after the adaptive directionality forming to output a demodulation signal. In this case, the adaptive weights are controlled by using a determination error signal in common to the arrays.

A receiving and demodulating section of the adaptive antenna reception apparatus according to the first embodiment of the present invention is comprised of L (L is a positive integer) path receiving sections 1-1 to 1-L respectively provided for paths of the multi-path. Each of the L path receiving sections inputs two groups of antenna-corresponding despread signals for two arrays of antennas 31-1-1 to 31-1-N and 31-2-1 to 31-2-N. The receiving and demodulating section is further comprised of a combining unit 9, a decision unit 10, a switch 11, and a subtractor 12, which are provided in common to the respect path receiving sections 1-1 to 1-L.

The path receiving sections 1-1 to 1-L have the same circuit structure and carry out the same operation. Therefore, the path receiving section 1-1 will be described below.

The path receiving section 1-1 is comprised of beam formers 2-1-1 and 2-2-1, channel estimating sections 3-1-1 and 3-2-1, complex conjugate calculating sections 4-1-1 and 4-2-1, multipliers 5-1-1 and 5-2-1, normalizing sections 6-1-1 and 6-2-1, and multipliers 7-1-1 and 7-2-1, which are provided for two arrays of antennas 31-1-1 to 31-1-N and 31-2-1 to 31-2-N, respectively. Also, the path receiving section 1-1 is further comprised of an antenna weight adaptive control section 8-1 common to the respective arrays.

The beam former 2-1-1 uses the antenna weights w peculiar to a user and generated adaptively to generate an antenna directionality. The beam former 2-1-1 converts the antenna-corresponding despread signals #1-1 to #1-N for the path #1 and for the array 31-1 using the antenna directionality to produce a path-corresponding beam former signal for the path #1. The beam former 2-2-1 carries out the same operation as that of the beam former 2-2-1 to the antenna-corresponding despread signals #2-1 to #2-N for the path #1 and for the array 31-2.

The channel estimating section 3-1-1 estimates a transmission path for the path #1 from the path-corresponding beam former signal of the beam former 2-1-1 to produce a channel estimation signal. The channel estimating section 3-2-1 carries out the same operation as that of the channel estimating section 3-1-1 to the path-corresponding beam former signal for the path #1 and for the array 31-2.

The complex conjugate calculating section 4-1-1 carries out a calculating operation of a complex conjugate of the channel estimation signal for the path #1 and for the array 31-1. The complex conjugate calculating section 4-2-1 carries out the same operation as that of the complex conjugate calculating section 4-1-1 to the transmission path signal for the path #1 and for the array 31-2.

The multiplier 5-1-1 multiplies the path-corresponding beam former signal from the beam former 2-1-1 and the complex conjugate of the channel estimation signal from the complex conjugate calculating sections 4-1-1, to correct a phase change for the path #1 and for the array 31-1. At this time, the multiplier 5-1-1 carries out a weighting operation for the maximum ratio combining. The maximum ratio combining is a method of weighting and combining such that SINR (signal power vs. interference noise power ratio) after the combining becomes maximum. Thus, a path-corresponding demodulation signal for the path #1 and for the array 31-1 is generated. The multiplier 5-2-1 carries out the same operation as that of the multiplier 5-1-1 to the path-corresponding beam former signal and the complex conjugate from the complex conjugate calculating section 4-2-1 for the path #1 and for the array 31-2. Thus, a path-corresponding demodulation signal for the path #1 and for the array 31-2 is generated.

The combining unit 9 adds all the path-corresponding demodulation signals from the multipliers 5-1-1 to 5-1-L and 5-2-1 to 5-2-L for a path-combining. At this time, the combining unit 9 carries out a diversity combining over the respective arrays 31-1 and 31-2. Thus, a demodulation signal for a user is outputted.

The decision unit 10 determines a transmission signal with a high user transmission possibility from the demodulation signal.

The switch 11 selects as a reference signal, a known reference signal when there is the known reference signal, and the output of the decision unit 10 when there is not any known reference signal.

The subtractor 12 subtracts the demodulation signal from the reference signal and generates a determination error signal. The determination error signal generated by the subtractor 12 is distributed to the path receiving sections 1-1 to 1-L.

The normalizing section 6-1-1 carries out a normalizing operation to the channel estimation signal estimated by the channel estimating section 3-1-1 to produce a scaling signal for the path #1 and for the array 31-1. The normalizing section 6-2-1 carries out the same operation as that of the normalizing section 6-1-1 to the channel estimation signal for the path #1 and for the array 31-2. Here, the normalizing sections 6-1-1 to 6-1-L, and 6-2-1 to 6-2-L may be omitted to reduce a calculation quantity.

The multiplier 7-1-1 multiplies the determination error signal and the scaling signal generated by the normalizing section 6-1-1 to produce an error signal. The multiplier 7-2-1 carries out the same operation as that of the multiplier 7-1-1 to the determination error signal and a scaling signal generated by the normalizing section 6-2-1.

The antenna weight adaptive control section 8-1 receives the antenna-corresponding despread signals #1-1 to #1-N and #2-1 to #2-N for the path #1 and for the arrays 31-1 and 32-1, and the error signals from the multipliers 7-1-1 and 7-2-1. Then, the antenna weight adaptive control section 8-1 updates the antenna weights adaptively by using the received antenna-corresponding despread signals and the received error signals. In the antenna weight adaptive control sections 8-1 to 8-L, a minimum mean squared error (MMSE) control is generally used. In the MMSE control, the control is carried out to maximize the reception SINR, and to direct the beam directionalities to a desired user signal. As the adaptive update algorithm using the error signal shown in the first embodiment, LMS (Least Mean Square) algorithm and RLS (Recursive Least Square) algorithm are known. For example, the antenna weights w(l,n) (l is a path number, and n is a symbol number) are common to the respective arrays 31-1 and 31-2 when the LMS algorithm is used and are updated in accordance with the following equation:

$$w(l, n+1) = w(l, n) + \mu [r_1(l, n)e_1 * (l, n) + r_2(l, n)e_2 * (l, n)]$$

where r1(l,n) and r2(l,n) respectively represent the despread signals for arrays 31-1 and 31-2 and for paths, $e_1^*(l,n)$ and $e_2^*(l,n)$ represent complex conjugates of the error signals after the inversion correction of the phase change for arrays and for the paths, and $\mu$ represents a step size in the LMS algorithm. In the first embodiment, an optional one of the above adaptive update algorithms can be applied.

Figure 4:
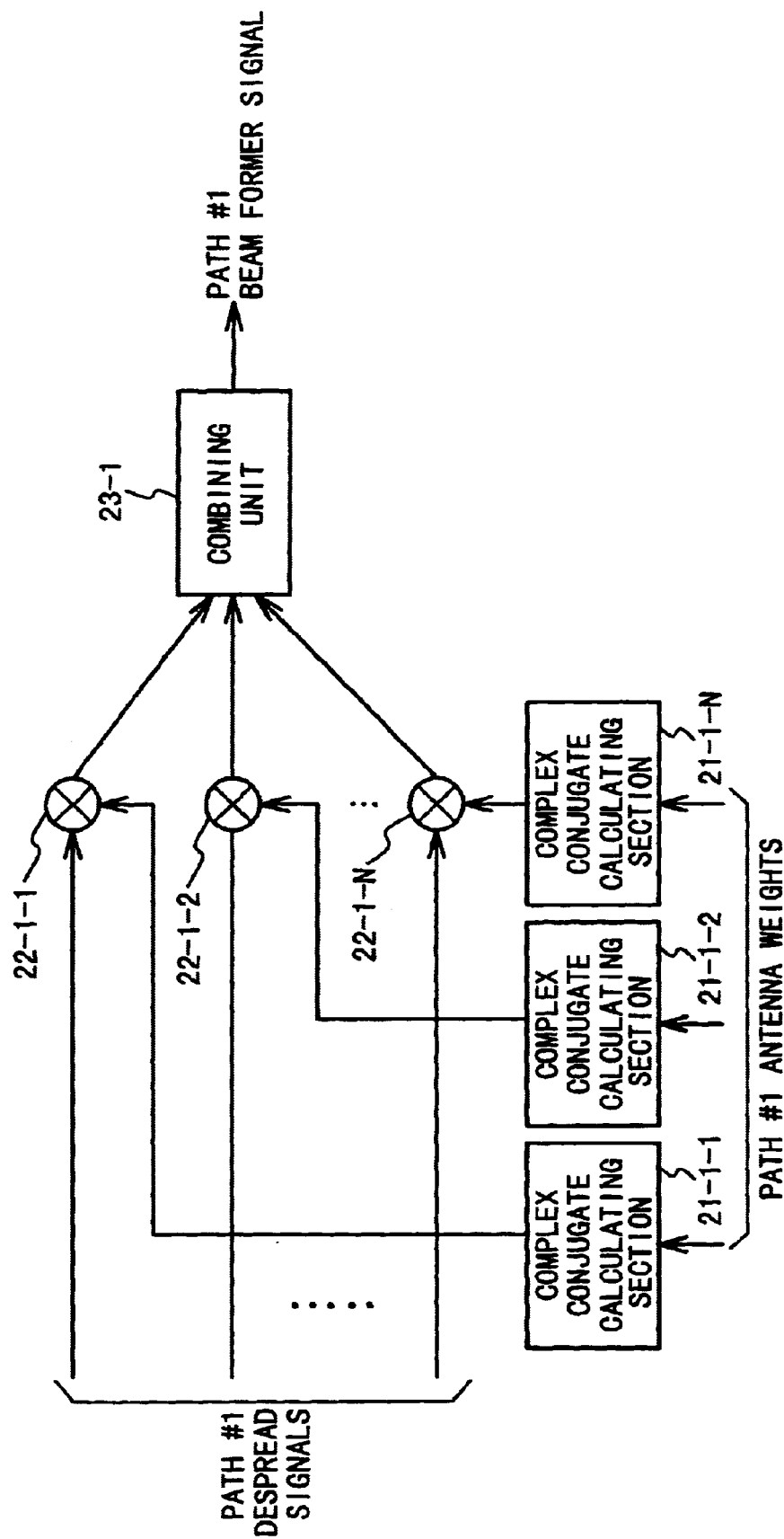
FIG. 4 is a block diagram showing the circuit structure of a beam former in the path #1 of FIG. 1.

FIG. 4 is a block diagram showing the circuit structure of the beam former 2-1-1 for the path #1 of FIG. 3. Referring to FIG. 4, the beam former 2-1-1 is comprised of complex conjugate calculating sections 21-1-1 to 21-1-N, multipliers 22-1-1 to 22-1-N and a combining unit 23-1. The complex conjugate calculating sections 21-1-1 to 21-1-N carry out complex conjugate calculating operations of the antenna weights for path #1 to produce complex conjugate weights. The multiplier 22-1-1 to 22-1-N multiply the antenna-corresponding despread signals for path #1 and the complex conjugate weights of the antenna weights, respectively. The combining unit 23-1 adds the respective outputs of the multipliers 22-1-1 to 22-1-N. It should be noted that although being not shown, the circuit structures of the beam formers 2-1-2 to 2-1-L, 2-2-1 to 2-2-L are same as the above-mentioned beam former 2-1-1.

Figure 5:
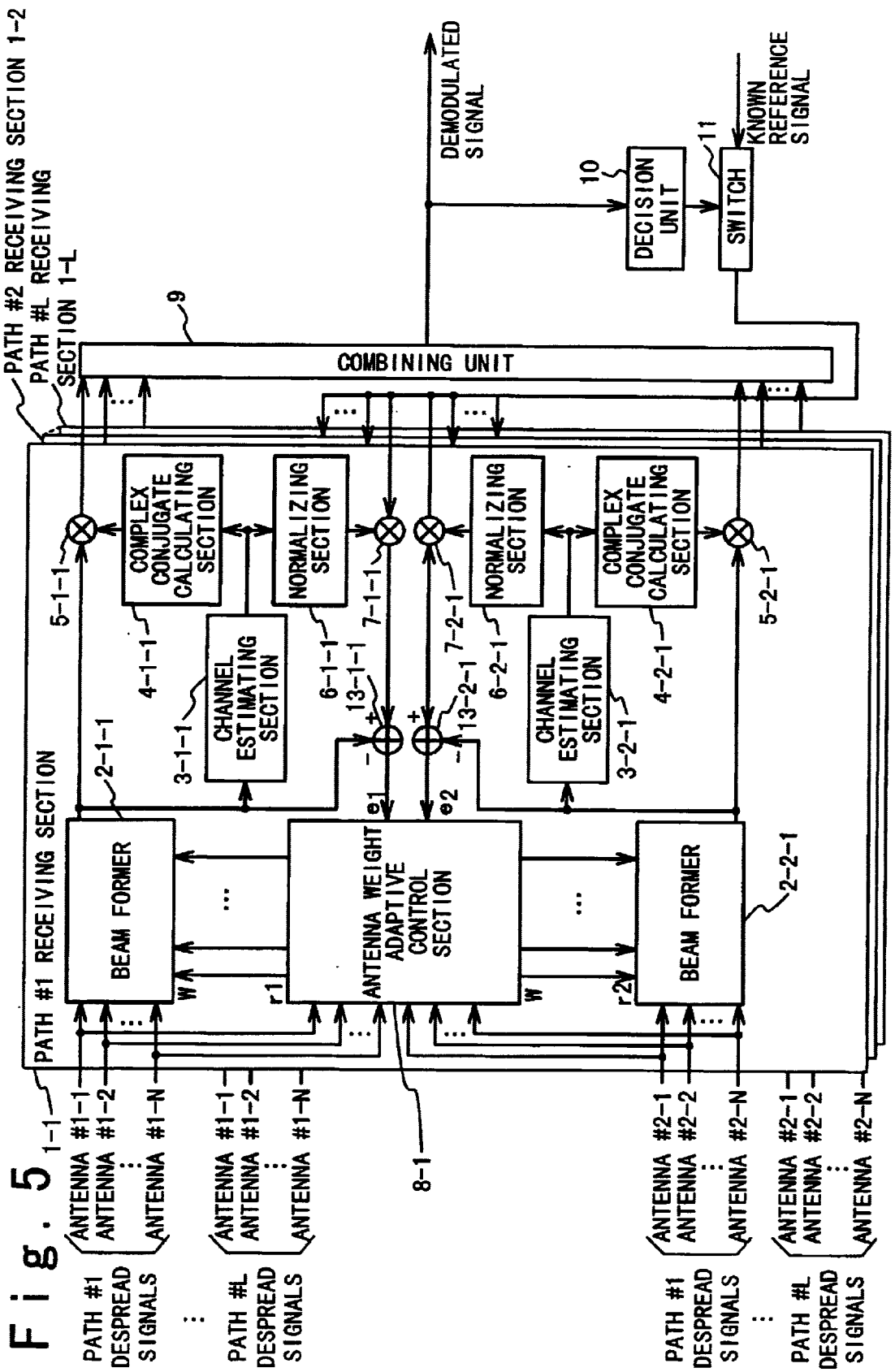
FIG. 5 is a block diagram showing the circuit structure of the adaptive antenna reception apparatus according to a second embodiment of the present invention.

FIG. 5 is a block diagram showing the circuit structure of the adaptive antenna reception apparatus according to the second embodiment of the present invention. Referring to FIG. 5, the adaptive antenna reception apparatus according to the second embodiment of the present invention has the same circuit structure as the adaptive antenna reception apparatus according to the first embodiment of the present invention shown in FIG. 3 except that the error signal is generated or detected using the path-corresponding beam former signal before the combining. The same components as in the first embodiment are allocated with the same reference numerals.

The receiving and demodulating section of the adaptive antenna reception apparatus according to the second embodiment of the present invention is comprised of L path receiving sections 1-1 to 1-L respectively provided for paths of the multi-path. Each of the L path receiving sections inputting two groups of antenna-corresponding despread signals. Also, the receiving and demodulating section is further comprised of a combining unit 9, a decision unit 10 and a switch 11 provided in common to the respect paths. The subtractor 12 in the first embodiment is omitted.

The path receiving sections 1-1 to 1-L have the same circuit structure and carry out the same operation. Therefore, the path receiving section 1-1 will be described below.

The path receiving section 1-1 is comprised of beam formers 2-1-1 and 2-2-1, channel estimating sections 3-1-1 and 3-2-1, complex conjugate calculating sections 4-1-1 and 4-2-1, multipliers 5-1-1 and 5-2-1, normalizing sections 6-1-1 and 6-2-1, multipliers 7-1-1 and 7-2-1, and multipliers 13-1-1 and 13-2-1, which are respectively provided for the arrays 31-1 and 31-2. Also, the path receiving section 1-1 is further comprised of an antenna weight adaptive control section 8-1 common to the respective sub-arrays.

The beam former 2-1-1 carries out the same operation as that of the beam former 2-2-1. The beam former 2-1-1 uses the antenna weights peculiar to a user and generated adaptively in common to the respective sub-arrays, and receives the antenna-corresponding despread signals #1-1 to #1-N with the antenna directionalities to produce a path-corresponding beam former signal.

The channel estimating section 3-1-1 carries out the same operation as that of the channel estimating section 3-2-1. The channel estimating section 3-1-1 estimates a transmission path for the path #1 and for the array 31-1 from the path-corresponding beam former signal of the beam former 2-1-1 to produce a channel estimation signal.

The complex conjugate calculating section 4-1-1 carries out the same operation as that of the complex conjugate calculating section 4-2-1. The complex conjugate calculating section 4-1-1 carries out a calculating operation of a complex conjugate of the channel estimation signal for the path #1 and for the array 31-1.

The multiplier 5-1-1 carries out the same operation as that of the multiplier 5-2-1. The multiplier 5-1-1 multiplies the path-corresponding beam former signal from the beam former 2-1-1 and the complex conjugate of the channel estimation signal from the complex conjugate calculating sections 4-1-1, to correct a phase change for the path #1 and for the array 31-1. At this time, the multiplier 5-1-1 carries out a weighting operation for the maximum ratio combining. The maximum ratio combining is a method of weighting and combining such that SINR (signal power vs. interference noise power ratio) after the combining becomes maximum. Thus, a path-corresponding demodulation signal for the path #1 and for the array 31-1 is outputted. Similarly, the multiplier 5-2-1 outputs a path-corresponding demodulation signal for the path #1 and for the array 31-2.

The combining unit 9 adds all the path-corresponding demodulation signals from the multipliers 5-1-1 to 5-1-L and 5-2-1 to 5-2-L for a path-combining. At this time, the combining unit 9 carries out a diversity combining over all the arrays 31-1 and 31-2. Thus, a demodulation signal for a user is outputted.

The decision unit 10 determines a transmission signal with a high transmission possibility from the demodulation signal.

The switch 11 selects as a reference signal, a known reference signal when there is the known reference signal, and the output of the decision unit 10 when there is not any known reference signal. The switch 11 distributes the reference signal to the path receiving sections 1-1 to 1-L.

The normalizing section 6-1-1 carries out the same operation as that of the normalizing section 6-2-1. The normalizing section 6-1-1 carries out a normalizing operation to the channel estimation signal estimated by the channel estimating section 3-1-1 to produce a scaling signal. Here, the normalizing sections 6-1-1 to 6-1-L, and 6-2-1 to 6-2-L may be omitted to reduce a calculation quantity.

The multiplier 7-1-1 carries out the same operation as that of the multiplier 7-2-1. The multiplier 7-1-1 multiplies the reference signal and the scaling signal to produce a scaled reference signal.

The subtractor 13-1-1 carries out the same operation as that of the subtractor 13-2-1. The subtractor 13-1-1 subtracts the path-corresponding beam former signal outputted from the beam former 2-1-1 from the scaled reference signal outputted from the multiplier 7-1-1 and generates an error signal.

The antenna weight adaptive control section 8-1 receives the antenna-corresponding despread signals #1-1 to #1-N and #2-1 to #2-N for the path #1 and for the arrays 31-1 and 32-1, and the error signals from the multipliers 7-1-1 and 7-2-1. Then, the antenna weight adaptive control section 8-1 updates common antenna weights adaptively by using the antenna-corresponding despread signals and all the error signal of the subtractors 13-1-1 to and 13-2-1. In the antenna weight adaptive control section 8-1 to 8-L, an MMSE control is generally used. In the MMSE control, the control is carried out to maximize the reception SINR, and to direct the beam directionality to a desired user signal. As the adaptive update algorithm using the determination error signal shown in the second embodiment, LMS (Least Mean Square) algorithm and RLS (Recursive Least Square) algorithm are known. The method of updating common antenna weights for the respective sub-arrays when the LMS algorithm is used is same as the first embodiment of the present invention shown in FIG. 3.

In the first and second embodiments of the present invention, peculiar antenna weights to the respective paths are used. However, a method of carrying out the adaptive control to use common antenna weights to the respective paths is devised. The circuit structure is mentioned in detail in Japanese Laid Open Patent application (JP-A-Heisei 11-055216). The present invention can be applied to the circuit structure. For example, when the LMS algorithm is used, the antenna weights w(n) (n is a symbol number) common to the arrays and for paths are updated in accordance with the following equation:

$$w(n+1) = w(n) + \mu \sum [r_1(l,n)e1*(l,n) + r_2(l,n)e2*(l,n)]$$

where $r_1(l,n)$ and $r_2(l,n)$ respectively represent the despread signals for the arrays and for the paths, $e1*(l,n)$ and $e2*(l,n)$ represent complex conjugates of the error signals when the inverse correction of the phase change for arrays and for the paths, $\mu$ represents a step size in the LMS algorithm, and $\Sigma$ shows a summation of l=1 to L.

Also, the circuit structure examples of two arrays 31-1 and 31-2 are described in the first and second embodiments of the present invention. However, the present invention can be applied to the optional number of arrays (two or more). Moreover, in the array antenna arrangement shown in FIG. 3, antennas arrays in which fading is independent are formed to separate the arrays. However, by using polarized electromagnetic radiation array antennas such as a vertical polarization array and a horizontal polarization array, antenna arrays in which fading is independent may be formed. In such a case, the circuit structure and effect are same as the embodiments and are contained in the present invention.

In this way, the CDMA signal is received by a plurality of antenna arrays in which fading is independent. The directionalities are formed with the common antenna weights to the despread signals of the respective antennas of the arrays. By controlling the common antenna weights using all the error signals for the arrays, an excellent adaptive control characteristic can be realized.

Especially, in the environment which the fading is severe, even when the signals of one array of antennas attenuates so that error signal is not obtained, the error signal can be combined based on the signals with larger signal levels from the other array of antennas. Therefore, the stable adaptive control can be realized without influence of the fading.

As described above, according to the present invention, in the adaptive antenna reception apparatus which receives a code division multiple access signal by the plurality of arrays of antennas in which fading is independent, directionalities are formed with the common antenna weights to the despread signals of the respective arrays of antennas, and the common antenna weights are controlled by using all the error signals to the arrays of antennas. Therefore, the excellent adaptive control characteristic can be realized.

What is claimed is:

1. An adaptive antenna reception apparatus comprising:
   a plurality of receiving sections, each of which is provided for a corresponding one of paths to generate a path-corresponding demodulation signal for said corresponding path and for a corresponding one of arrays of antennas from path-corresponding despread signals for said corresponding path and for said corresponding array using adaptive weights for said corresponding array; and
   a combining unit which combines said path-corresponding demodulation signals over all said arrays and all said paths to generate a demodulation signal.

2. The adaptive antenna reception apparatus according to claim 1, wherein each of said plurality of receiving sections comprises
   a plurality of beam formers, each of which generates a path-corresponding beam former signal for said corresponding array from said path-corresponding despread signals for said corresponding path and for said corresponding array using said adaptive weights for said corresponding array;
   a plurality of phase change correction sections, each of which is provided for said plurality of beam formers, calculates a channel estimation signal from said path-corresponding beam former signal for said corresponding array signal and carries out a phase change correction to said path-corresponding beam former signal for said corresponding array based on said channel estimation signal to produce said path-corresponding demodulation signal for said corresponding array; and
   a weight adaptive control section (8) which is provided for said plurality of beam formers to supply said adaptive weights to said plurality of beam formers based on said path-corresponding despread signals and error signals for said corresponding path and said arrays, said error signal showing a difference between said demodulation signal and a determined transmission signal or a known reference signal.

3. The adaptive antenna reception apparatus according to claim 2, wherein each of said plurality of phase change correction sections comprises:
   a channel estimating section which estimates said channel estimation signal from said path-corresponding beam former signal;
   a correction value calculating unit which calculates a correction value from said channel estimation signal; and
   a phase correction multiplier which multiplies said path-corresponding beam former signal and said correction value to produce said path-corresponding demodulation signal.

4. The adaptive antenna reception apparatus according to claim 2, further comprising:
   a decision unit which determines said determined transmission signal from said demodulation signal;
   a switch section which selects as a reference signal, one of said determined transmission signal and said known reference signal; and
   a subtractor which subtracts said demodulation signal from said reference signal to produce a subtraction resultant signal, and
   wherein each of said plurality of receiving sections further comprises:
      an error signal generating section which multiplies said subtraction resultant signal and said channel estimation signal or a scaling data signal obtained from said channel estimation signal to produce and supply said error signal to said weight adaptive control section.

5. The adaptive antenna reception apparatus according to claim 4, wherein each of said plurality of receiving sections further comprises:
   a normalizing section which generates said scaling data signal from said channel estimation signal.

6. The adaptive antenna reception apparatus according to claim 1, wherein each of said plurality of receiving sections comprises:
   a plurality of beam formers, each of which generates a path-corresponding beam former signal for said corresponding array from said path-corresponding despread signals for said corresponding path and for said corresponding array using said adaptive weights for said corresponding array;
   a plurality of phase change correction sections, each of which is provided for said plurality of beam formers, calculates a channel estimation signal from said path-corresponding beam former signal for said corresponding array signal and carries out a phase change correction to said path-corresponding beam former signal for said corresponding array based on said channel estimation signal to produce said path-corresponding demodulation signal for said corresponding array; and a weight adaptive control section which is provided for said plurality of beam formers to supply said adaptive weights to said plurality of beam formers based on said path-corresponding despread signals and error signals for said corresponding path and said arrays, said error signal showing a difference between said path-corresponding beam former signal for said corresponding array and a scaled signal corresponding to a determined transmission signal or a known reference signal.

7. The adaptive antenna reception apparatus according to claim 6, wherein each of said plurality of phase change correction sections comprises:

a channel estimating section which estimates said channel estimation signal from said path-corresponding beam former signal;

a correction value calculating unit which calculates a correction value from said channel estimation signal; and a phase correction multiplier which multiplies said path-corresponding beam former signal and said correction value to produce said path-corresponding demodulation signal.

8. The adaptive antenna reception apparatus according to claim 6, further comprising:

a decision unit which determines said determined transmission signal from said demodulation signal; and a switch section which selects as a reference signal, one of said determined transmission signal and said known reference signal, wherein each of said plurality of receiving sections further comprises:

a scaled signal generating section which multiplies said reference signal and said channel estimation signal or a scaling data signal obtained from said channel estimation signal to produce said scaled signal; and a subtractor which subtracts said path-corresponding beam former signal for said corresponding array from said scaled signal to produce and supply said error signal to said weight adaptive control section.

9. The adaptive antenna reception apparatus according to claim 8, wherein each of said plurality of receiving sections further comprises:

a normalizing section which generates said scaling data signal from said channel estimation signal.

10. The adaptive antenna reception apparatus according to claim 1, wherein fading is independent in said arrays.

11. A method of demodulating a demodulation signal form a code division multiple access (CDMA) signal, said method comprising the steps of:

(a) generating path-corresponding despread signals for a corresponding one of paths and for a corresponding one of arrays of antennas from signals obtained by receiving said CDMA by said antennas of said corresponding array;

(b) generating a path-corresponding beam former signal for said corresponding array from said path-corresponding despread signals for said corresponding array using adaptive weights;

(c) generating a path-corresponding demodulation signal for said corresponding array from said path-corresponding beam former signal; and (d) combining said path-corresponding demodulation signal over all said paths and all said arrays to produce said demodulation signal.

12. The method according to claim 11, wherein said step of (c) generating comprises the steps of:

estimating a transmission path for said corresponding array from said path-corresponding beam former signal for said corresponding array to produce a channel estimation signal for said corresponding array;

calculating a phase change correction signal for said corresponding array from said channel estimation signal for said corresponding array; and generating said path-corresponding demodulation signal for said corresponding array from said path-corresponding beam former signal for said corresponding array and said phase change correction signal for said corresponding array.

13. The method according to claim 11, wherein said step of (b) generating comprises the step of:

(e) generating said adaptive weights from said path-corresponding despread signals and an error signal for said corresponding path and said corresponding array, said error signal showing a difference between said demodulation signal and a determined transmission signal or a known reference signal.

14. The method according to claim 13, wherein said step of (e) generating comprises the step of:

determining a transmission signal from said demodulation signal;

selecting as a reference signal, one of said transmission signal and said known reference signal;

subtracting said demodulation signal from said reference signal to produce a subtraction resultant signal; and multiplying said subtraction resultant signal and said channel estimation signal or a scaling data signal obtained from said channel estimation signal to produce said error signal.

15. The method according to claim 14, wherein said step of (b) generating further comprises the step of:

generating said scaling data signal from said channel estimation signal.

16. The adaptive according to claim 11, wherein said step of (b) generating comprises the step of:

(f) generating said adaptive weights from said path-corresponding despread signals and an error signal for said corresponding path and said corresponding array, said error signal showing a difference between said path-corresponding beam former signal for said corresponding array and a scaled signal corresponding to a determined transmission signal or a known reference signal.

17. The method according to claim 16, wherein said step of (f) generating comprises the step of:

determining said determined transmission signal from said demodulation signal;

selecting as a reference signal, one of said determined transmission signal and said known reference signal;

multiplying said reference signal and said channel estimation signal or a scaling data signal obtained from said channel estimation signal to produce said scaled signal; and subtracting said path-corresponding beam former signal for said corresponding array from said scaled signal to produce said error signal.

18. The method according to claim 17, wherein said step of (b) generating further comprises the step of:

generating said scaling data signal from said channel estimation signal.

* * * * *